United States Patent [19]

Abramson et al.

[11] 4,435,037
[45] Mar. 6, 1984

[54] FIBER OPTIC CONNECTOR WITH DEFORMABLE MOUNTING POST

[75] Inventors: Edward A. Abramson, Newark, Del.; Peter K. Townsend, Camp Hill, Pa.

[73] Assignee: E. I. Du Pont de Nemours and Company, Wilmington, Del.

[21] Appl. No.: 318,944

[22] Filed: Nov. 6, 1981

[51] Int. Cl.³ ............................................. G02B 7/26
[52] U.S. Cl. .................................................. 350/96.20
[58] Field of Search ............. 350/96.21, 96.20, 96.22, 350/96.15; 250/227; 357/74

[56] References Cited

U.S. PATENT DOCUMENTS

| | | | |
|---|---|---|---|
| 4,181,401 | 1/1980 | Jensen | 350/96.21 |
| 4,184,741 | 1/1980 | Hawk et al. | 350/96.20 |
| 4,186,994 | 2/1980 | Denkin et al. | 350/96.17 |
| 4,192,574 | 3/1980 | Henry et al. | 350/96.17 |
| 4,204,743 | 5/1980 | Etaix | 350/96.20 |
| 4,257,672 | 3/1981 | Balliet | 350/96.17 |
| 4,273,413 | 6/1981 | Bendiksen et al. | 350/96.20 |

FOREIGN PATENT DOCUMENTS

| | | | |
|---|---|---|---|
| 2750322 | 11/1977 | Fed. Rep. of Germany | 350/96.20 |
| 3007803 | 9/1981 | Fed. Rep. of Germany | 350/96.20 |
| 55-95919 | 7/1980 | Japan | 350/96.20 |
| 2023928 | 1/1980 | United Kingdom | 350/96.18 |
| 2071867 | 9/1981 | United Kingdom | 350/96.20 |

Primary Examiner—John D. Lee
Assistant Examiner—Frank González

[57] ABSTRACT

An optical connector for coupling a semiconductor light source to an optical fiber transmission line. A light source such as a light emitting diode is mounted on a movable post within a housing in juxtaposition to the end of an optical fiber centered within a channel in a connector housing. The optical fiber is held stationary whereas the post supporting the light emitting diode is moved by a probe inserted through multiple aligning ports until the diode is properly positioned for optimum light coupling into the fiber.

8 Claims, 6 Drawing Figures

Legend:
✶ = Void(Space)

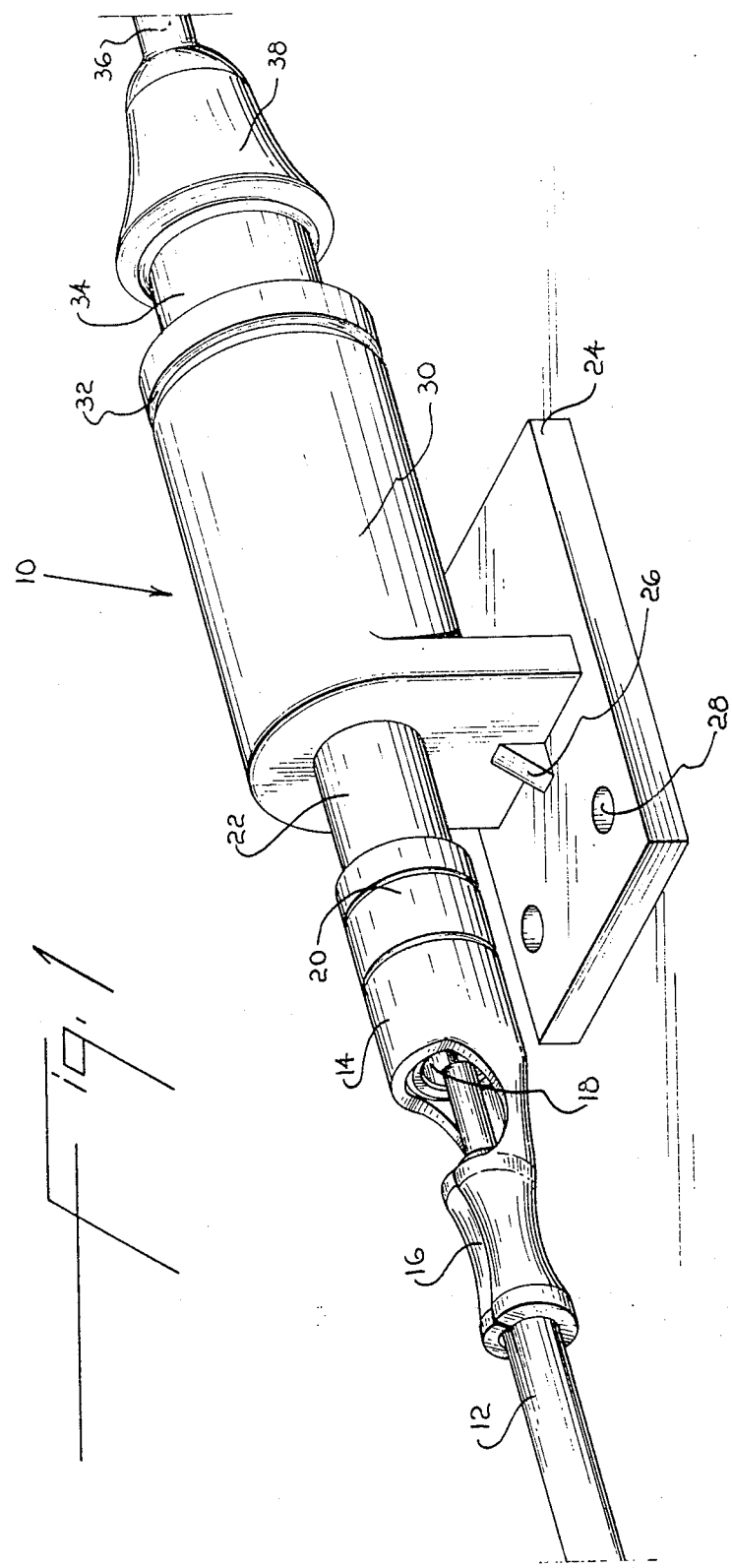

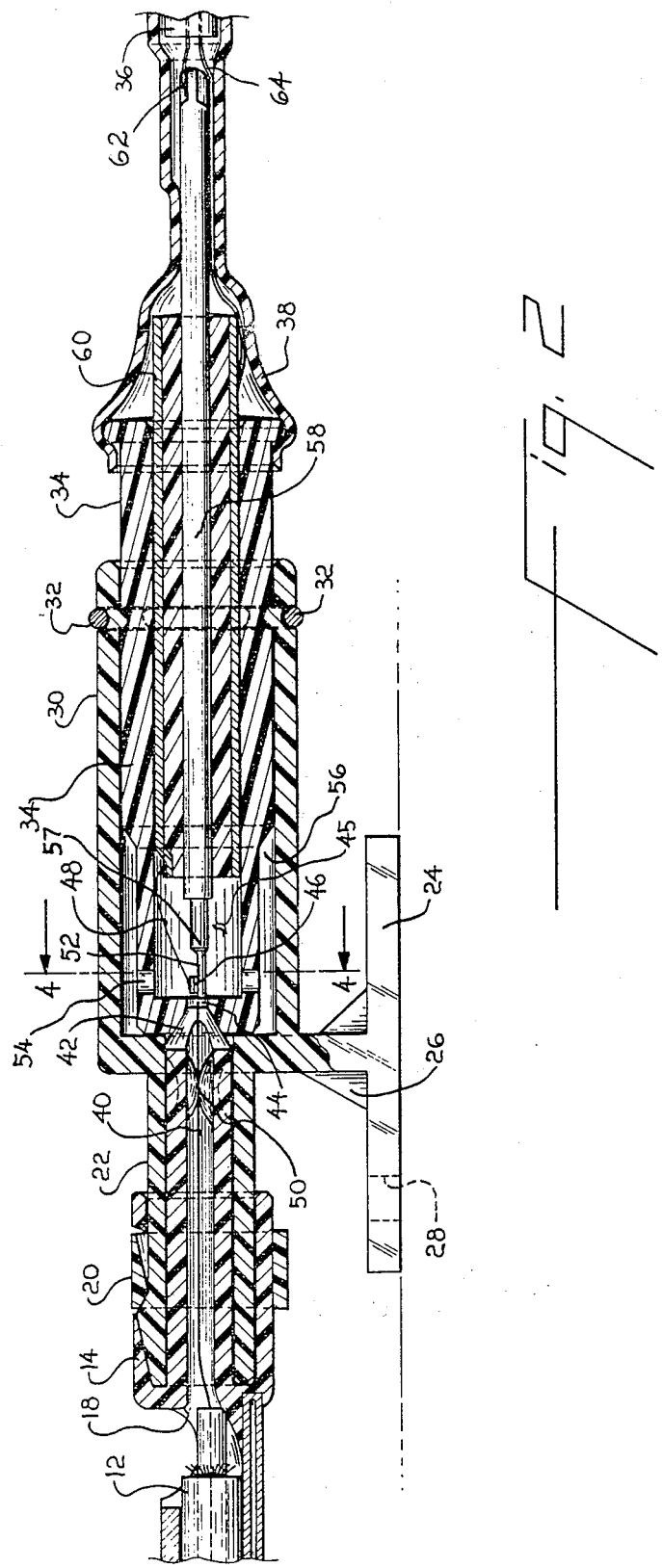

Legend:
∬ = Void(Space)

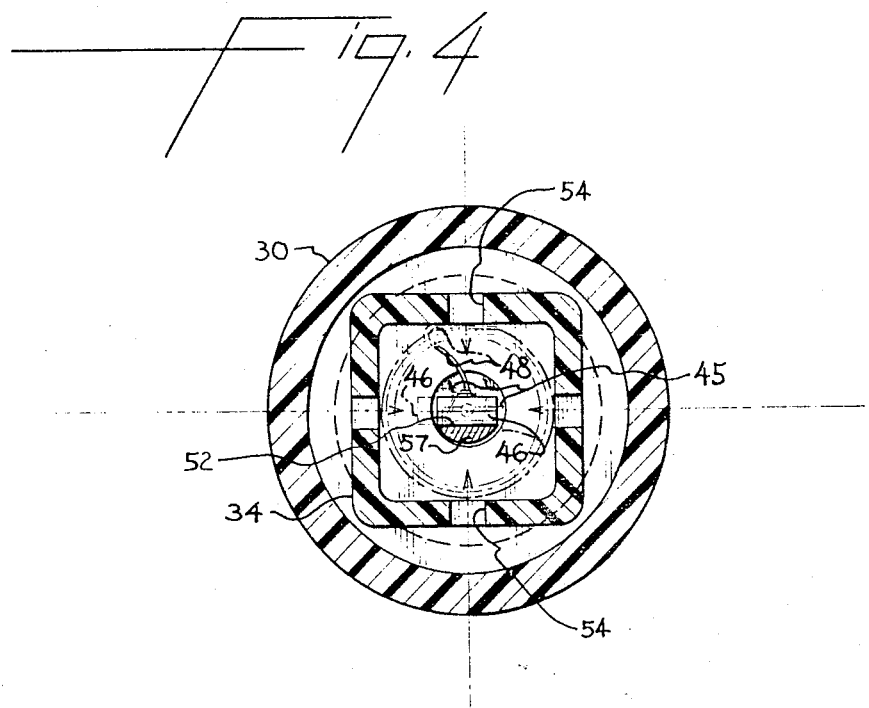

FIBER OPTIC CONNECTOR WITH DEFORMABLE MOUNTING POST

DESCRIPTION

1. Technical Field

This invention relates to optical connectors. More specifically it refers to a device for coupling light between an optical fiber and a semiconductor light source such as a light emitting diode or an injection laser diode.

2. Background Art

A light emitting diode (LED) or an injection laser diode (ILD) will give off visible or infrared light when it is energized by an electrical source (electroluminescence). The use of LEDs predominate in handheld calculators, clocks and other electrical devices incorporating a visual display of digits.

LED's can be subclassified as edge emitters or surface emitters. Edge emitters emit light in a direction parallel to the plane of their internal p-n junction. Since the p-n junction is parallel to the largest geometric faces of the diode the light is emitted parallel to these same faces. Surface emitters emit light in a direction perpendicular to the plane of their p-n junction and likewise perpendicular to their largest geometric faces.

All known ILDs are edge emitters. These ILDs and the edge-emitting LEDs developed specifically for use with optical fibers are of the stripe-geometry type; i.e., the generation of light is confined to a narrow strip of the p-n junction. For further background information on semiconductor light sources refer to:

S. E. Miller and A. G. Chynoweth, Ed., "Optical Fiber Telecommunications", Academic Press, 1979.

M. K. Barnoski, Ed., "Fundamentals of Optical Fiber Communications", Academic Press, 1976.

With the development of fiber optic systems it has become important to couple the light energy between an optical fiber and an LED or ILD. Unfortunately, it is difficult to correctly locate an LED or ILD to provide the maximum amount of light energy to a given optical fiber because of the small surface area on the optical fiber accepting the light energy from the LED or ILD.

Several attempts for proper alignment have been made by the prior at as can be seen in the following patents:

U.S. Pat. No. 4,186,994
U.S. Pat. No. 4,192,574
U.S. Pat. No. 4,204,743
U.S. Pat. No. 4,257,672
U.S. Pat. No. 4,273,413 and
West German Offenlegungschrift No. 27 50 322.

Although these references teach different methods of aligning optical fibers and diodes, no cheap, reliable and consistent method is set forth.

SUMMARY OF THE INVENTION

We have solved the problem discussed above with a device that provides for mounting the diode on a movable plane surface within a housing in juxtaposition to the end of an optical fiber centered within a channel of a connector housing. The optical fiber is held firmly in place with a heat crimp. The light emitting diode or laser diode is mounted on a plane surface which is moved by a probe inserted through multiple aligning ports until the diode is aligned with the optical fiber so that optimum light coupling is achieved.

BRIEF DESCRIPTION OF DRAWINGS

The present invention may be best understood by those of ordinary skill in the art by reference to the following detailed description when considered in conjunction with the accompanying drawings in which:

FIG. 1 is a perspective of the housings containing the diode and fiber optical cable.

FIG. 2 is a longitudinal section of the housings shown in FIG. 1 with the optical fiber and an edge-emitting diode exposed.

FIG. 4 is a vertical cross section through 4—4 of FIG. 2 showing the point where the optical fiber is closest to an edge-emitting diode.

DESCRIPTION OF THE PREFERRED EMBODIMENT

Figure 2A:
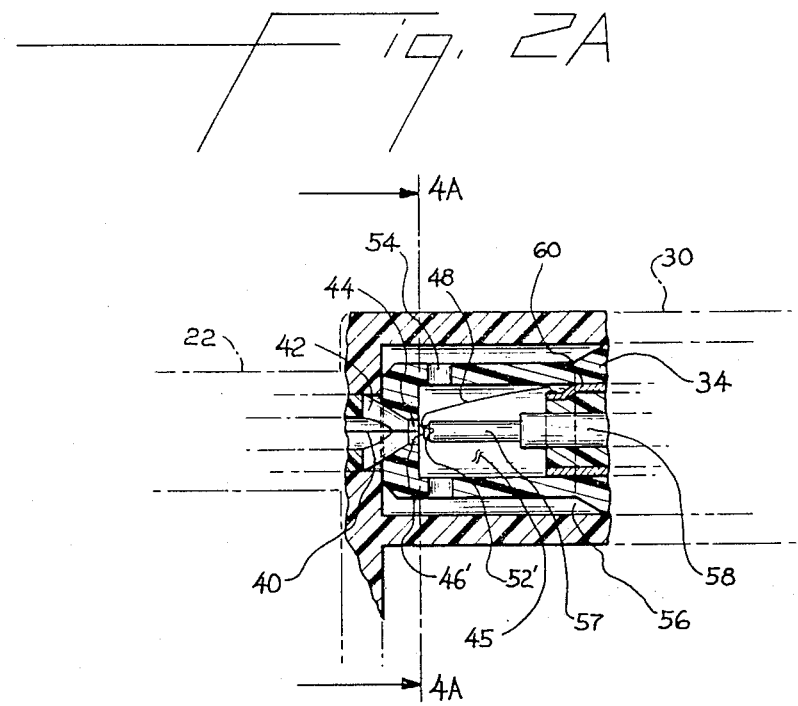
FIG. 2A is a partial section of a longitudinal view with the optical fiber and surface-emitting diode exposed.
Figure 4A:
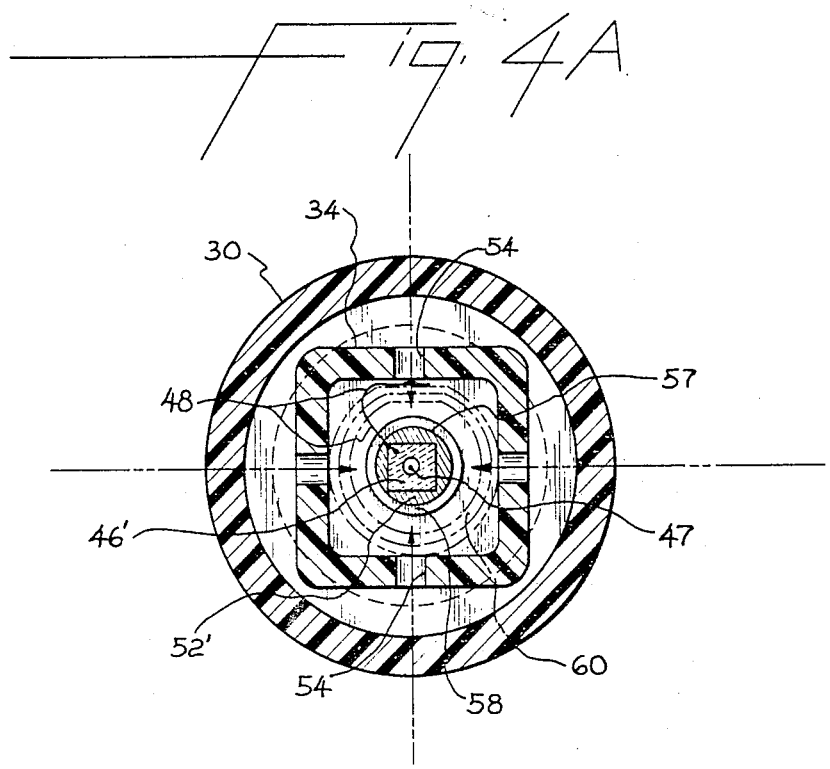
FIG. 4A is a vertical cross section through 4A—4A of FIG. 2A showing the point where the optical fiber is closest to a surface-emitting diode.

Referring now to the drawings in which like reference characters designate like or corresponding parts throughout the several views there is shown in FIGS. 1, 2 and 2A the fiber optical cable 12 which contains a single optical fiber with its cladding and double protective jacketing. The cable jacketing is stripped so that the clad optical fiber 40 is exposed within the single channel fiber optical connector 14. The cable 12 is crimped at 16 to prevent movement with respect to the connector 14. The connector 14 contains a funnel entry 18 through which the optical fiber 40 enters the interior of connector 14. A posi-lock snap lock 20 surrounds the connector 14 and retains it within the receiving port 22 of the light source connector 10.

The light source connector 10 consists of a base 24, supports 26 and mounting holes 28. The light source connector 10 has a housing 30 with snap rings 32 holding the front portion of the housing 30 in contact with the light source connector body 34. A power cable 36 exits from the end of the heat shrunk tubing 38 which also surrounds a portion of the light source connector body 34.

The clad optical fiber 40 is held in place within the connector 14 by a heat crimp 50. The fiber exits from a conically shaped male end 42 of the connector 14 and enters into a void 44 in front of the source diode 46 or 46'. The fiber end is positioned as close to the source diode as possible without touching it. The diode 46 or 46' is mounted permanently by means of conductive epoxy or solder to an electrically and thermally conductive plane surface 52 or 52' which is in turn electrically connected to the power cable 36 through a movable copper post 57, copper rod 58, and solder point 62. FIG. 2 illustrates a plane mounting surface 52 and movable post 57 suitable for edge-emitting LEDs or ILDs 46. FIG. 2A illustrates a plane mounting surface 52' and movable post 57 suitable for surface-emitting LEDs 46'.

The diode 46 or 46' is electrically connected to the outer conductive shell 60 by a gold wire 48. Multiple aligning ports 54 allow a probe to touch the movable post 57 containing mounting surface 52 or 52'.

The light source connector 10 also contains voids 45 and 56. The outer conductive shell 60 surrounds the inner portion of the light source connector body 34. The wire 64 connects shell 60 to the power cable 36.

The housing 30 and the light source connector body 34 are made of a dielectric plastic such as a polyamide. The heat shrunk tubing 38 is made of a polymeric material such as tetrafluoroethylene. The optical fiber 40 can be any of the fibers used in fiber optical systems; i.e., glass or plastic or combinations thereof. The light emitting diode 46 or 46' can be any available diode giving off light after being energized by electroluminescence. The diode 46 can be also any ILD giving off coherent monochromatic light.

Figure 3:
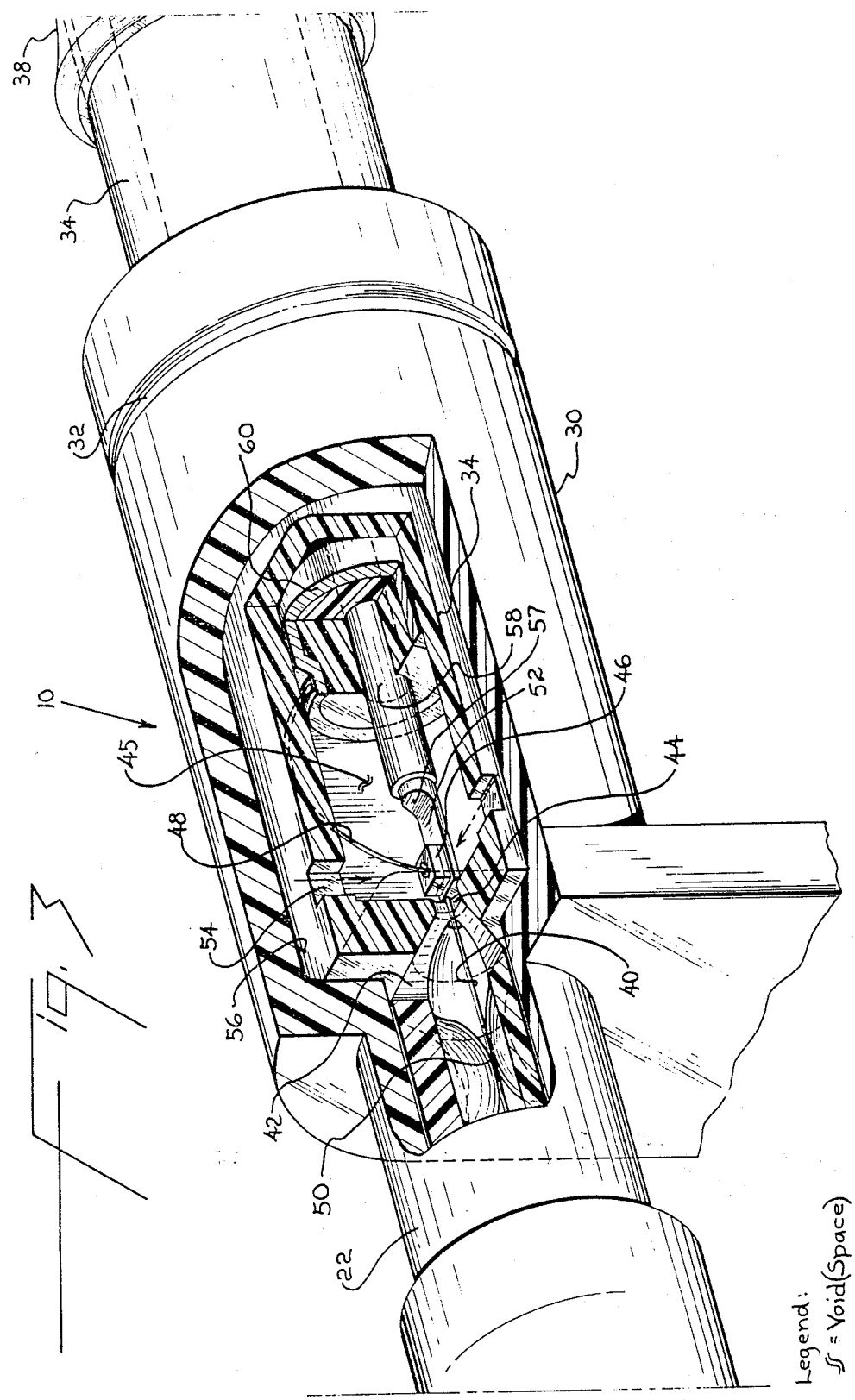
FIG. 3 is a cutaway perspective showing the position of the optical fiber in relation to the edge-emitting diode mounted on a plane surface within its housing.

After the diode 46 or 46' is activated by electrical power reaching it through cable 36, a receiver such as a photodiode is set up to monitor the optical power coupled into and through the optical fiber from the diode 46 or 46'. Thereafter, the movable post 57 containing the mounting surface 52 or 52' and the diode 46 or 46' is moved by a probe inserted through the aligning ports 54 until the optimum amount of optical power is detected by the receiver. At this point the movable post 57 is plastically deformed so that the diode 46 or 46' is permanently set in this maximum light coupling position. This insures a permanent and optimum fix of the diode 46 or 46' in relation to the optical fiber. FIG. 3 shows the permanently mounted diode 46 sitting on the surface 52 in juxtaposition to the end of the fiber 40.

Having thus described the invention what is claimed as new and desired to be secured by Letters Patent is:

1. An apparatus for coupling an optical fiber to a light emitting or injection laser diode comprising
   a light source connector body at least partially retained within a first dielectric housing, said connector body containing an electrically conducting rod and a deformable post containing a plane surface extending from said rod,
   said diode permanently mounted on said plane surface,
   at least one aligning port through said connector body exposing said deformable mounting post,
   an optical fiber firmly mounted within a second housing, said second housing connected to said first housing so that an end of said optical fiber is in juxtaposition to said diode,
   means for moving said post until maximum light from said diode is coupled into said optical fiber and means for plastically deforming said post to a permanent position once said maximum light coupling is achieved.

2. An apparatus according to claim 1 in which said optical fiber is mounted within said second housing by a heat crimp and an end of said fiber exits from a conically shaped member at one end of said second housing nearest to said first housing.

3. An apparatus according to claim 1 in which there are four equally spaced apart aligning ports through said connector body.

4. An apparatus according to claims 1 or 2 in which the first housing is mounted on said connector body with snap rings.

5. An apparatus according to claim 1, 2 or 3 in which the second housing is mounted on a receiving port extending from said first housing with a snap lock.

6. An apparatus according to claim 1 in which the optical fiber is glass.

7. An apparatus according to claim 1 in which the optical fiber is an optical plastic.

8. An apparatus according to claim 1 in which the optical fiber has a glass core with a plastic optical cladding.

* * * * *